US007059773B2

(12) United States Patent
Hafen et al.

(10) Patent No.: US 7,059,773 B2
(45) Date of Patent: Jun. 13, 2006

(54) HYDRODYNAMIC BEARING, SPINDLE MOTOR AND HARD DISK DRIVE

(75) Inventors: Martin Hafen, Spaichingen (DE); Joerg Hoffmann, Mettlach (DE); Dieter Braun, Spaichingen (DE)

(73) Assignee: Minebea Co., Ltd., Nagano-ken (JP)

( * ) Notice: Subject to any disclaimer, the term of this patent is extended or adjusted under 35 U.S.C. 154(b) by 45 days.

(21) Appl. No.: 10/979,064

(22) Filed: Nov. 2, 2004

(65) Prior Publication Data

US 2005/0100255 A1 May 12, 2005

(30) Foreign Application Priority Data

Nov. 11, 2003 (DE) ................................ 103 52 573

(51) Int. Cl.
*F16C 17/02* (2006.01)

(52) U.S. Cl. ....................................... 384/119; 384/114

(58) Field of Classification Search ................ 384/107, 384/114, 119, 120, 110
See application file for complete search history.

(56) References Cited

U.S. PATENT DOCUMENTS

| | | | | |
|---|---|---|---|---|
| 5,667,309 | A | 9/1997 | Nose | 384/132 |
| 2004/0008910 | A1 | 1/2004 | Oelsch | 384/100 |
| 2004/0028301 | A1 | 2/2004 | Kull et al. | 384/107 |

FOREIGN PATENT DOCUMENTS

| | | |
|---|---|---|
| DE | 202 11 588 | 8/2003 |
| DE | 202 18 170 | 10/2003 |
| DE | 102 31 962 | 2/2004 |

*Primary Examiner*—Lenard A. Footland
(74) *Attorney, Agent, or Firm*—Baker & Daniels

(57) ABSTRACT

The invention relates to a hydrodynamic bearing having a shaft, a bearing sleeve that encloses the shaft with a short radial spacing forming a concentric bearing gap, and an equalizing volume that is disposed between an outer circumference of the bearing sleeve and a covering cap at least partly overlapping the bearing sleeve and firmly fixed with respect to the bearing sleeve and connected to the bearing gap via at least one connecting channel or gap, a bearing fluid filling the bearing gap and the connecting channel/gap fully and the equalizing volume at least partially and the bearing fluid forming a continuous fluid film between the bearing gap and the equalizing volume.

13 Claims, 3 Drawing Sheets

HYDRODYNAMIC BEARING, SPINDLE MOTOR AND HARD DISK DRIVE

BACKGROUND OF THE INVENTION

The invention relates to a hydrodynamic bearing, a spindle motor and a hard disk drive.

OUTLINE OF THE PRIOR ART

A spindle motor for a hard disk drive usually comprises a rotating component, the rotor, with which an annular permanent magnet is associated, and a stationary component, the stator, with which a lamination stack wound with coils is associated, the rotor being rotatably supported with respect to the stator by means of an appropriate bearing system.

Hydrodynamic bearings are being increasingly used alongside roller bearings which have been in use for a long time. A hydrodynamic bearing is a further development on a sliding bearing, consisting of a bearing sleeve having a cylindrical inner bearing surface and a shaft having a cylindrical outer bearing surface set into the sleeve. The diameter of the shaft is slightly smaller than the inside diameter of the sleeve as a result of which a concentric bearing gap is formed between the two bearing surfaces, the bearing gap being filled with a lubricant, preferably an oil, forming a continuous capillary film.

To prevent bearing oil from escaping from the hydrodynamic bearing, one end face of the bearing sleeve is sealed with an airtight seal. At the opposite open end, a concentric, tapered area can be formed between the shaft and the inner bearing surface which acts as both a lubricant reservoir and an expansion volume. This tapered area also takes on the function of sealing the bearing.

Under the influence of capillary forces, the oil in the area between the shaft and the conical opening of the bearing sleeve forms a stable, continuous fluid film which is why this kind of seal is also called a capillary seal.

Such a solution is described, for example, in U.S. Pat. No. 5,667,309. At its top end, the bearing sleeve has a tapered area forming an area widening into a concentric, conically-shaped region between the shaft and the bearing sleeve. This area acts as an expansion volume into which the bearing oil can rise when the fluid level increases with a rise in temperature. This goes to prevent bearing oil from escaping from the bearing tube. The tapered area additionally functions as a lubricant reservoir to replace vaporizing bearing oil. Here, the bearing is intentionally "overfilled" to enable the effective fluid level in the bearing gap to be maintained at an almost constant level despite vaporization of the bearing oil. The concentric tapered area thus acts as a kind of overflow volume which, at the same time, forms a lubricant reservoir. The disadvantage lies in the fact that the retention capability, and thus also the sealing effect, of this concentric, tapered area diminishes due its cross-section widening towards the outside.

A further disadvantage of this known solution is that the useful length of the bearing, and consequently the bearing stiffness, is reduced by the overall axial length of such a capillary seal, i.e. the concentric, conical-shaped tapered area. Here, the overall axial length of the sealing cone and the related angle of inclination are dependent on the desired filling volume and the viscosity of the bearing oil. Low viscosity bearing oils need a smaller, more acute angle and thus a larger overall length for the same filling volume. For fluid bearings which have bearing sleeves with two open ends, the length available for the hydrodynamic radial bearing is reduced equally on both ends of the bearing sleeve. In addition, the capability of the bearing to retain the bearing oil film is reduced due to its cross-section widening at the ends of the bearing sleeve. This means that, in practice, hydrodynamic bearings with a bearing sleeve sealed at one end are basically preferable due to their superior retention capability. Another disadvantage arises from the fact that at high speeds considerable centrifugal forces are exerted on the bearing oil which could induce the bearing oil in the tapered area to rise as high as the edge of the bearing sleeve thus increasing the risk of this oil being thrown off.

An important criterion for determining the suitability of hydrodynamic bearings in hard disk drives, particularly in portable devices, is that they must have the highest possible stiffness. One possible way of achieving this objective is by maximizing the length of the bearing, although, as outlined above, a suitably adapted capillary seal of the described art would be particularly disadvantageous in terms of overall length and thus in terms of the effective bearing length. This consequently places severe restrictions on the dimensioning of a hydrodynamic radial bearing having sufficient stiffness and, under certain circumstances, makes it totally impossible for very small-scale spindle motors.

SUMMARY OF THE INVENTION

It is thus the object of the invention to provide a hydrodynamic bearing having an appropriate, non-contact seal which has low power loss, high bearing stiffness and a long lifespan.

This object has been achieved by a hydrodynamic bearing having the characteristics outlined in claim 1. The invention also includes a spindle motor according to claim 18 as well as a hard disk drive according to claim 19.

Beneficial embodiments of the invention are outlined in the dependent patent claims.

The invention provides a hydrodynamic bearing for a spindle motor having a rotating or stationary shaft and an associated, preferably cylindrical, bearing sleeve that encompasses the shaft. Due to the slight difference in the diameters of the shaft and the cylindrical bearing sleeve, a bearing gap is formed which is filled with a bearing fluid. In the region of the bearing gap, at least one radial bearing section is formed in the shaft and/or in the cylindrical bearing sleeve. As known in the prior art, this radial bearing section is formed in particular by forming a groove pattern on the inner surface of the bearing sleeve. In the hydrodynamic bearing according to the invention, an equalizing volume for the bearing fluid is provided which at the same time forms an expansion volume into which the bearing fluid can expand when the fluid level increases as the temperature rises, and which acts as a lubricant reservoir to replace vaporizing bearing fluid. According to the invention, this equalizing volume is arranged between an outer circumference of the bearing sleeve and a covering cap, which at least partially overlaps the bearing sleeve and which is firmly fixed with respect to the bearing sleeve, and is connected to the bearing gap by at least one connecting channel/gap.

The invention has the advantage that the equalizing volume need not be formed along the useful bearing length in a section of the bearing gap but that it can rather be disposed outside the bearing gap and, in particular, relocated to the region of the outer circumference of the bearing sleeve and connected to the bearing gap via the connecting channel/gap. This means that the bearing sleeve can be formed with the same diameter along the entire length of the bearing thus creating a bearing gap having a maximum useful length. The radial bearing sections of the hydrodynamic bearing can consequently be formed in close proximity to the respective bearing ends with a maximum spacing between each other thus achieving optimum bearing stiffness. Another advantage is that no frictional loss is incurred in the bearing fluid in the region of the equalizing volume and the connecting channel since the bearing sleeve and the covering cap, between which the equalizing volume extends, are firmly fixed with respect to each other.

Provision is made for an equalizing volume to be preferably formed in the region of at least one end of the bearing sleeve and its outer circumference. In a preferred embodiment of the invention, the equalizing volume is adjacent to the top end of the bearing sleeve and runs concentrically and essentially parallel to the rotational axis of the bearing at the outer circumference of the bearing sleeve.

Since the equalizing or storage volume in the hydrodynamic bearing according to the invention is disposed outside the bearing gap, preferably running essentially parallel to the rotational axis of the bearing, and has a cross-section widening from the region at the edge of the bearing sleeve towards the mid-length of the bearing sleeve, with a connection to the connecting channel/gap being located at the end having the smallest cross-section, this bearing is equally suitable for motors having a stationary shaft and/or a bearing sleeve open at each end.

The hydrodynamic bearing according to the invention can be used in electric motors and in particular in spindle motors for hard disk drives.

The equalizing or storage volume is arranged and designed in such a way that, due to capillary forces, the bearing fluid held within it is effectively restrained at all times when the bearing is exposed to radial and axial shock, and thus cannot escape from the bearing.

Since the equalizing volume is disposed at the outer circumference of the bearing sleeve, preferably in a space created by the bearing sleeve and the covering cap, no centrifugal forces are exerted on the bearing fluid particularly in the case of a stationary bearing sleeve, so that even under radially and axially effective accelerating forces, the spin-off of bearing fluid due to drop formation is practically excluded. In the case of a rotating bearing sleeve, other arrangements may have to be made to prevent bearing fluid from escaping.

Both the arrangement of the equalizing volume outside the bearing gap as well as its design, having a cross-section widening towards the mid-length of the bearing sleeve, effectively prevent any bearing oil from escaping so that, alongside an increase in lifespan, the functional reliability of the hydrodynamic bearing, in particular, is significantly improved.

In one embodiment of the invention the connecting channel/gap is provided in the region of the top end of the bearing sleeve and is directly adjacent to the bearing gap, whereas in another embodiment of the invention the connecting channel/gap is indirectly connected to the radial bearing section via a section of the bearing gap, a re-circulation channel and a region of the thrust bearing. Important for both embodiments is that a capillary connection is created between the radial bearing section and the connecting channel/gap so that the bearing fluid forms a continuous capillary film from the bearing gap via the connecting channel/gap to the equalizing volume.

The bearing fluid fills the connecting channel/connecting gap fully and the equalizing volume at least partially and forms a continuous fluid film between the bearing gap and the equalizing volume.

The connecting channel/gap can be preferably formed fully or at least partly within the bearing sleeve or within a covering cap covering the open end of the bearing sleeve. The connecting channel preferably extends in an approximately perpendicular plane to the rotational axis. Here, the connecting channel can be formed as a bore or as a channel-like depression in the bearing sleeve or in the cover as well.

In one beneficial embodiment of the invention, the connecting channel/gap is formed as a circumferential capillary annular gap extending from the inside diameter to the outside diameter of the bearing sleeve which connects the radial bearing section or the bearing gap to the equalizing volume. The connecting channel/gap can also form part of the equalizing volume and, in this case, is given the corresponding thickness and volume.

In a particularly preferred embodiment of the invention, the connecting channel/gap is formed between one end of the bearing sleeve and a covering cap arranged at a short spacing from this end and parallel to it. The covering cap at least partly overlaps an end of the bearing sleeve and a region of the outer circumference of the bearing sleeve. The bottom of the covering cap is arranged with a spacing from the end of the bearing gap. An annular gap is thus formed between the two opposing surfaces that extends from the inside diameter of the bearing sleeve as far as its outside diameter. The spacing between the end of the bearing sleeve and the covering cap is so dimensioned that a capillary film can be formed between the two. The annular gap leads into the equalizing volume.

The equalizing volume is arranged at the outer circumference of the bearing sleeve approximately parallel to the rotational axis of the bearing but can generally extend in any desired angle $\alpha$ to the rotational axis between 0° and 90°. The equalizing volume widens towards the mid-length of the bearing sleeve taking the shape of a cone. This conical tapering can be effected, not only by the design of the bearing sleeve but also by the design of the covering cap. The equalizing volume can take the form of one or more local reservoirs or of an annular volume extending around the outer circumference of the bearing sleeve.

The outer edge of the covering cap is connected to seal the outer circumference of the bearing sleeve so that no bearing fluid can escape at this point. This preferably goes to create an equalizing volume formed as a concentric, rotation-symmetric cavity whose tapered cross-section widens from the region adjacent to the connecting channel.

Another embodiment of the invention provides that the edge of the covering cap does not fit tightly, at least in part, against the outer circumference of the bearing sleeve.

The equalizing volume and the connecting channel/gap are connected to each other in the region at the outer edge of the bearing sleeve so that a continuous capillary film is created between the bearing gap and the equalizing volume via the connecting channel/gap.

To make it easier to fill the bearing with bearing fluid, provision is made in accordance with a preferred embodiment of the invention for the covering cap to have an opening in the region of the equalizing volume through which bearing fluid can be filled into the equalizing volume.

Due to the fact that the flow of bearing fluid has to be directed towards the inside of the bearing in order to build up pressure in the bearing, undesirable differences in pressure between the outer region and the inside of the bearing are created, particularly in the region of the axial bearing. In order to remedy this situation, provision has been made in an embodiment of the invention for at least one re-circulation channel for the bearing fluid to be formed in the bearing sleeve which connects the regions of the bearing gap located at the two ends of the bearing sleeve to each other and ensures an equalization of pressure within the fluid-carrying regions of the bearing.

The re-circulation channel can be provided either outside the bearing sleeve or preferably inside the bearing sleeve and preferably extends approximately parallel to the rotational axis of the bearing. It can, however, form any other angle between 0° and 90° to the rotational axis. In a preferred embodiment of the invention, one end of the re-circulation channel is connected to the connecting channel/gap and the other end is connected to the bearing gap in the axial bearing region of the bearing.

The re-circulation channel has the further advantage that in the event of a shock-like jolt to the bearing, the bearing fluid can spread quickly and evenly thus preventing pressure maxima or minima which could jeopardize the reliable operation of the bearing.

BRIEF DESCRIPTION OF THE DRAWINGS

Preferred embodiments of the invention are described in more detail below with reference to the drawings.

DESCRIPTION OF PREFERRED EMBODIMENTS OF THE INVENTION

Figure 1:
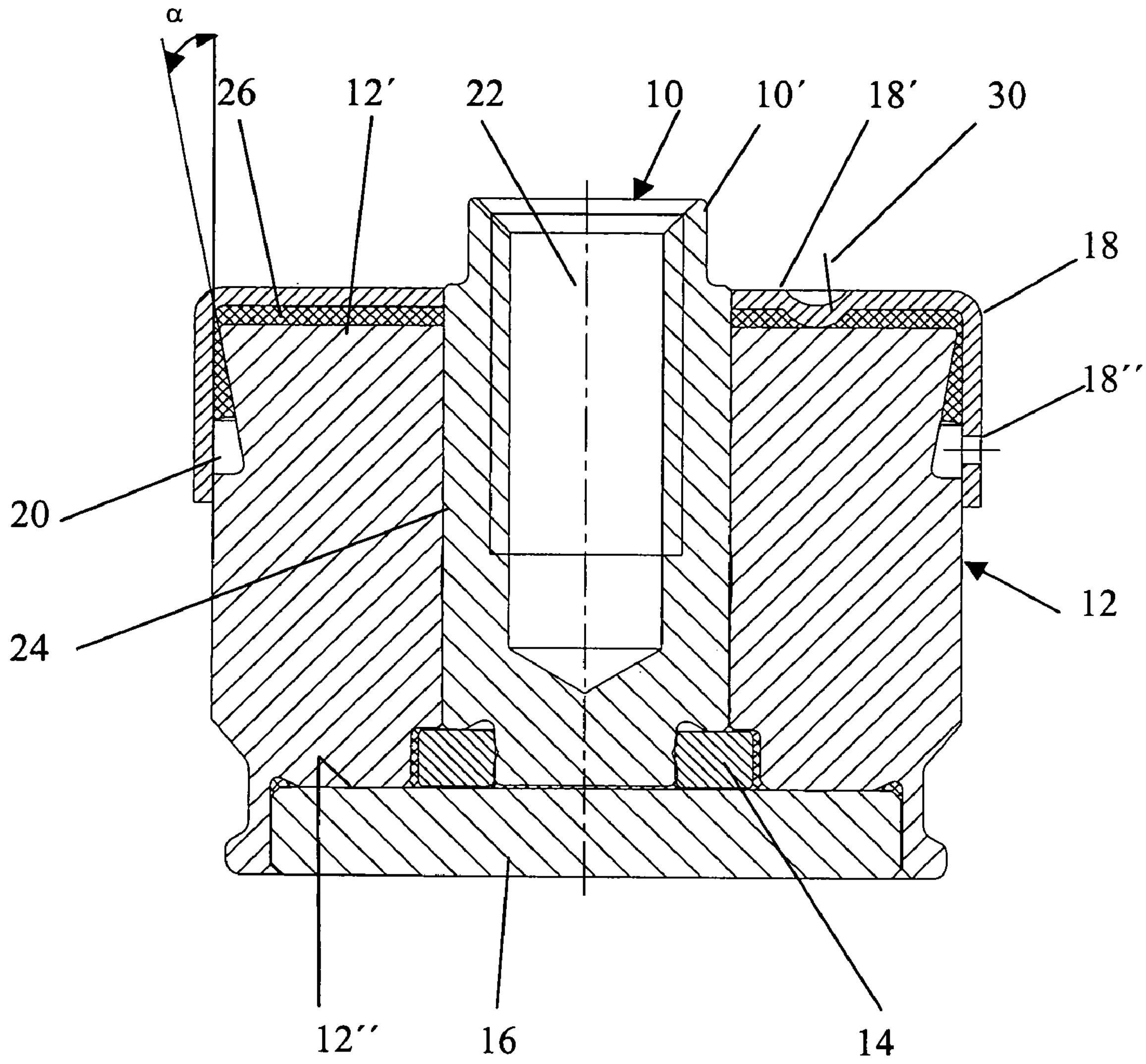
FIG. 1 shows a schematic longitudinal section through a hydrodynamic bearing according to a first embodiment of the invention.

In the drawings, corresponding components are indicated with the same identification reference numbers. In the illustrated embodiments, a shaft is rotatably supported in a stationary bearing sleeve. It is clear that the invention also includes designs in which a stationary shaft is enclosed by a rotatable bearing sleeve.

The hydrodynamic bearing shown in FIG. 1 comprises a shaft 10 which is accommodated in a cylindrical bearing sleeve 12. The shaft 10 has a thrust plate 14 at the end enclosed by the bearing sleeve 12, this end face 12" of the bearing sleeve 12 being sealed by a counter plate 16 which takes up the axial bearing load exerted on the shaft 10 via the thrust plate 14. Both the thrust plate 14 and the counter plate 16 are accommodated in suitably dimensioned recesses in the bearing sleeve 12.

The end 10' of the shaft 10 protrudes from the bearing sleeve 12. The bearing sleeve 12 is closed at this end by the bottom 18' of the covering cap 18 which has a central opening. The covering cap overlaps an end face 12' of the bearing sleeve as well as a part of the adjoining outer circumference of the sleeve.

A small spacing is provided between the end face 12' of the bearing sleeve 12 and the bottom 18' of the covering plate 18 whose size is defined by a spacer 30. The spacer 30 is preferably molded from the material of the covering cap 18, but can also be formed as part of the bearing sleeve 12 or as a separate part. Between the end face 12' of the bearing sleeve 12 and the bottom 18' of the covering plate 18, which is aligned essentially parallel to the end face 12', a connecting channel/gap 26 is formed by means of the maintained spacing which runs essentially perpendicular to the rotational axis 22 of the hydrodynamic bearing and whose width can preferably be from several micrometers up to some ten micrometers or even more.

As is known, a bearing gap 24 is formed between the shaft 10 and the bearing sleeve 12, this bearing gap 24 being connected via the connecting channel/gap 26 at the end face 12' of the bearing sleeve 12 to an equalizing volume 20 that is described in more detail below. The connecting channel/gap 26 is preferably formed as a circumferential annular gap which forms and maintains a capillary connection between the bearing gap 24 and the equalizing volume 20.

The equalizing volume 20 is arranged between the outer circumference of the bearing sleeve 12 and the covering cap 18 enclosing this region of the bearing sleeve 12 and is formed in the embodiment illustrated in the figures in that the outer circumference of the bearing sleeve 12 preferably has an undercut taking the form of a circumferential tapered recess that widens in an axial direction. A concentric, conical annular space is thus formed between the covering cap 18 and the bearing sleeve which runs at an angle a with respect to the rotational axis 22, the base of the cone being connected via the connecting channel/gap 26 to the bearing gap 24.

In the illustrated embodiment, radial bearing sections (not illustrated) are preferably formed on the inside diameter of the bearing sleeve 12 by means of one or more groove patterns on the inside diameter of the bearing sleeve 12 or on the outside diameter of the shaft 10. In addition, in the region of the thrust plate 14 and the counter plate 16, axial bearing sections can be formed using a known method. Since the equalizing volume 20 and the connecting channel/gap 26 connecting the bearing gap 24 to the equalizing volume 20 are formed at the end face 12' of the bearing sleeve 12, the entire length of the bearing sleeve 12 is available for one or more radial bearing sections to be formed. In particular, two radial bearing sections can be formed at the respective end sections of the bearing sleeve 12 with a maximum spacing between one another so that maximum bearing stiffness can be achieved.

After the hydrodynamic bearing presented in the invention has been assembled, the bearing gap 24, the connecting channel/gap 26 and a part of the equalizing volume 20 are filled with bearing fluid, preferably with an oilbased bearing fluid. The hydrodynamic bearing is filled with bearing fluid through a hole 18" provided in the covering cap 18 which leads directly into the equalizing volume 20. The hole 18" is made so small so as to practically exclude any bearing fluid from escaping should the bearing be subject to shock.

The filling ratio for filling the equalizing volume 20 with fluid is chosen in such a way that, on the one hand, sufficient lubricant can be filled in to ensure continuous lubrication of the hydrodynamic bearing over its entire lifespan. On the other hand, enough space must be left in the filled part of the equalizing volume 20 so that the bearing fluid can expand into this space when, during operation, the overall volume of the fluid increases after a rise in temperature due to differences in thermal expansion coefficients.

That part of the equalizing volume 20 not filled with bearing fluid will become concentrated with gaseous fluid due to the vaporization rate of the bearing fluid, the vaporization rate becoming increasingly slower as the saturation rate increases.

To the extent that bearing fluid vaporizes into the atmosphere from the bearing gap 24 via its contact surfaces, it is replaced by the bearing fluid in the equalizing volume 20 by means of the continuous capillary film stabilized by the micro-gap 26 existing between the bearing gap 24 and the equalizing volume.

This goes to ensure that the bearing gap 24 is fully filled with bearing fluid over its entire lifespan so, that, in principle, the hydrodynamic bearing according to the invention never suffers from insufficient lubrication.

Figure 2:
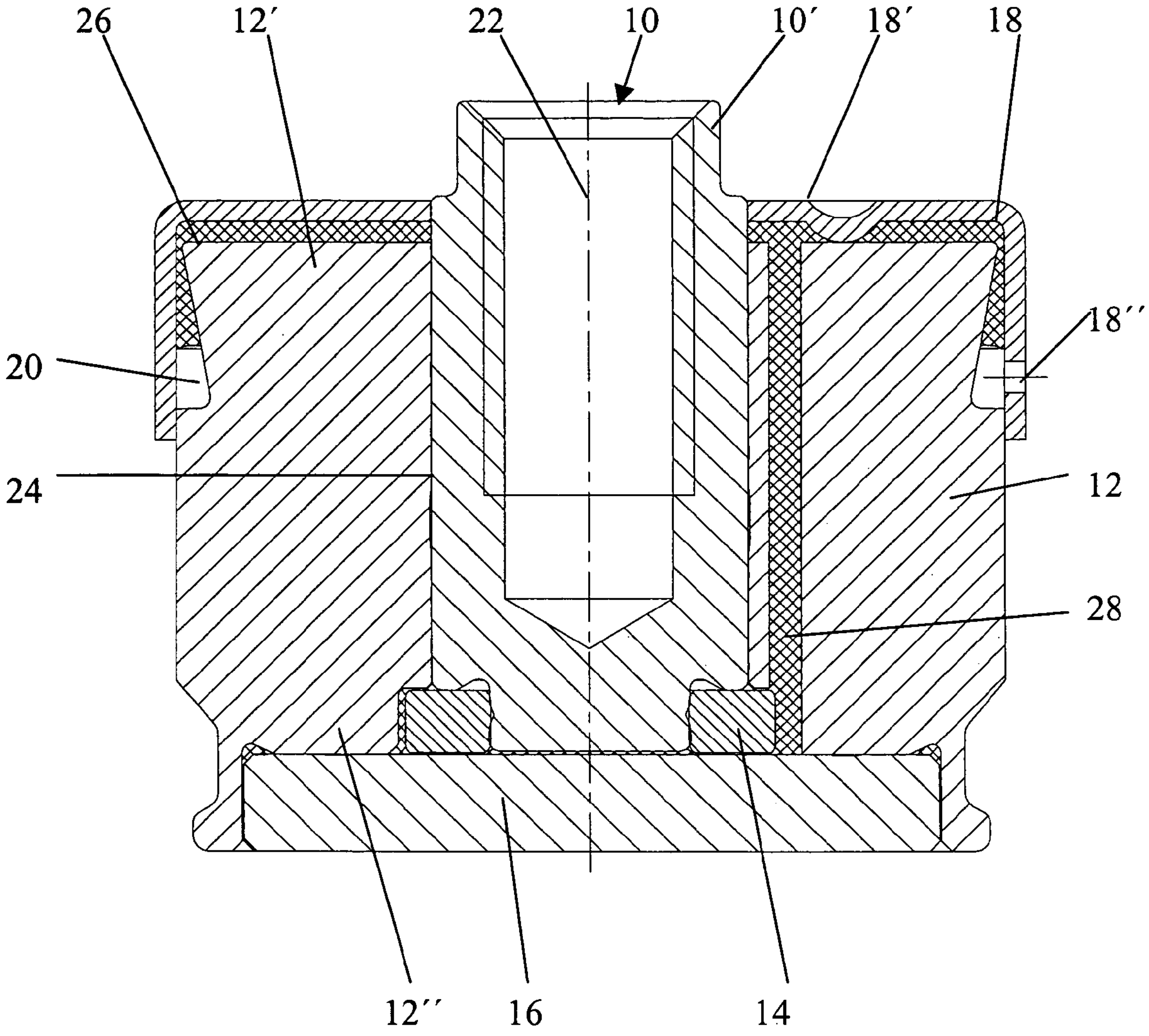
FIG. 2 shows a schematic longitudinal section through a hydrodynamic bearing according to a second embodiment of the invention.

FIG. 2 shows a schematic longitudinal section of a second embodiment of the invention. The embodiment in FIG. 2 differs from FIG. 1 in that a re-circulation channel 28 is provided between the end of the bearing sealed by the counter plate 16, that is in the region of the axial bearing, and the open end of the bearing. The re-circulation channel 28 is preferably disposed within the bearing sleeve 12 and connects the region of the bearing gap 24 at the sealed end of the bearing to the region of the bearing gap 24 at the open end of the bearing, ensuring the circulation and pressure equalization of the bearing fluid within the regions of the bearing gap that are spaced apart from each other.

In the illustrated embodiment, one end of the re-circulation channel 28 leads into the bearing gap in the region of the thrust plate 14 and the other end of the re-circulation channel 28 leads into the connecting channel/gap 26. It is clear that several such re-circulation channels 28 can be provided and distributed over the circumference of the bearing sleeve 12 to ensure an even flow of pressure in the bearing gap 24 seen from the circumference of the bearing.

The characteristics revealed in the above description, the claims and the figures can be important for the realization of the invention in its various embodiments both individually and in any combination whatsoever.

Figure 3:
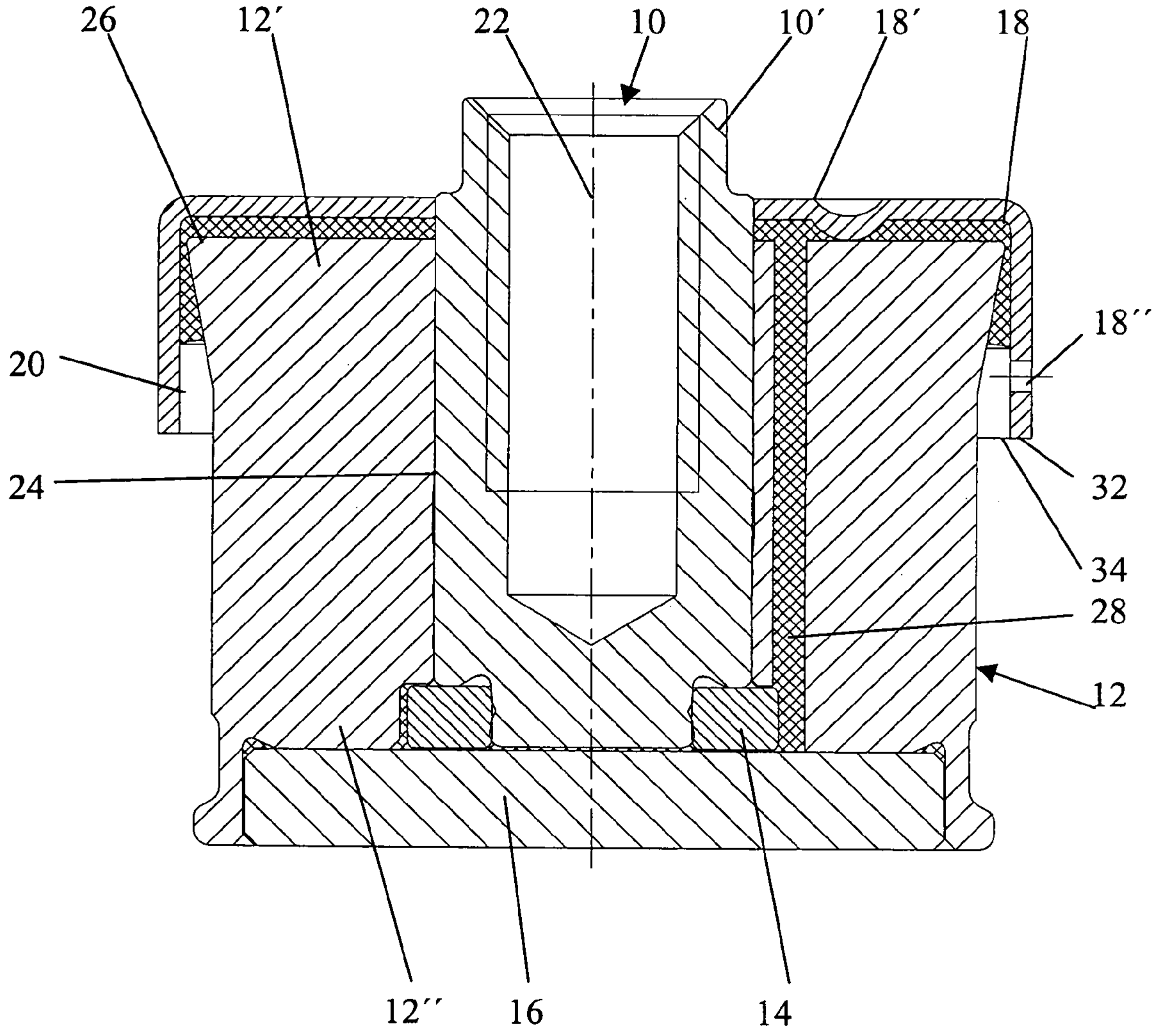
FIG. 3 shows a schematic longitudinal section through a hydrodynamic bearing according to a third embodiment of the invention.

The embodiment of the invention illustrated in FIG. 3 corresponds to the embodiment according to FIG. 2, the explanations given in relation to FIG. 2 applying here accordingly. The only difference compared to the embodiment according to FIG. 2 is that the edge 32 of the covering cap 18 does not fit tightly, at least in part, against the outer circumference of the bearing sleeve 12. An approximately annular opening 34 remains between the outer circumference of the bearing sleeve 12 and the inner circumference of the covering cap 18. This embodiment has the advantage that it is easier to fill the equalizing volume 20 with bearing fluid since the annular opening 34 can be used for filling purposes. In the region of the edge 32 of the covering cap, spacers, similar to the spacer 30, can be provided that ensure that the covering cap 18 is well-seated on the bearing sleeve 12. This means that it is no longer necessary to provide a separate filling hole 18".

IDENTIFICATION REFERENCE LIST

10 Shaft
10' Shaft end
12 Bearing sleeve
12', 12" End face of the bearing sleeve
14 Thrust plate
16 Counter plate
18 Covering cap
18' Bottom of the covering cap
18" Hole (filling)
20 Equalizing volume
22 Rotational axis
24 Bearing gap
26 Connecting channel/gap
28 Re-circulation channel
30 Spacer
32 Edge of the covering cap
34 Opening

The invention claimed is:

1. A hydrodynamic bearing having a shaft, a bearing sleeve that encloses the shaft with a short radial spacing forming a concentric bearing gap, and an equalizing volume that is disposed between an outer circumference of the bearing sleeve and a covering cap at least partly overlapping the bearing sleeve and firmly fixed with respect to the bearing sleeve and connected to the bearing gap via at least one connecting channel or gap.

2. A hydrodynamic bearing according to claim 1, characterized by a bearing fluid which fills the bearing gap and the connecting channel/gap fully and the equalizing volume at least partially, the bearing fluid forming a continuous fluid film between the bearing gap and the equalizing volume.

3. A hydrodynamic bearing according to claim 1, characterized in that the connecting channel/connecting gap is provided in the region of one end face of the bearing sleeve and is directly adjacent to the bearing gap.

4. A hydrodynamic bearing according to claim 1, characterized in that at least one radial bearing is formed in the region of the bearing gap and the connecting channel/connecting gap is connected to the radial bearing via a section of the bearing gap.

5. A hydrodynamic bearing according to claim 1, characterized in that the connecting channel/gap is at least partly formed within the bearing sleeve.

6. A hydrodynamic bearing according to claim 1, characterized in that the equalizing volume is at least partly formed within the bearing sleeve.

7. A hydrodynamic bearing according to claim 1, characterized in that the covering cap at least partly overlaps an end face and a region of the outer circumference of the bearing sleeve.

8. A hydrodynamic bearing according to claim 1, characterized in that the covering cap has an opening in the region of the equalizing volume through which bearing fluid can be filled into the equalizing volume.

9. A hydrodynamic bearing according to claim 1, characterized in that the connecting channel/gap is at least partly formed within the covering cap.

10. A hydrodynamic bearing according to claim 1, characterized in that the connecting channel/gap is part of a cavity formed between the outside of the bearing sleeve and the inside of the bottom of the covering cap.

11. A hydrodynamic bearing according to claim 1, characterized in that the equalizing volume is formed between an outer circumferential surface of the bearing sleeve and an inner circumferential surface of the covering cap.

12. A hydrodynamic bearing according to claim 1, characterized in that the connecting channel/gap extends at an angle $\alpha$ to the rotational axis of the bearing.

13. A hydrodynamic bearing according to claim 1, characterized in that the equalizing volume is formed as a cavity with a conical cross-section whose base is connected to the bearing gap via the connecting channel/gap.

* * * * *